US007911972B2

(12) United States Patent
Manisor et al.

(10) Patent No.: US 7,911,972 B2
(45) Date of Patent: Mar. 22, 2011

(54) ACCESS MULTIPLEXER SYSTEM FOR PERFORMING A STATELESS AUTO-CONFIGURATION PROCESS

(75) Inventors: Razvan Manisor, Nuremberg (DE); Sven Maurice Joseph Ooghe, Ghent (BE); Piet Michel Albert, Ghent (BE)

(73) Assignee: Alcatel, Paris (FR)

( * ) Notice: Subject to any disclaimer, the term of this patent is extended or adjusted under 35 U.S.C. 154(b) by 1129 days.

(21) Appl. No.: 11/269,574

(22) Filed: Nov. 9, 2005

(65) Prior Publication Data

US 2006/0098656 A1 May 11, 2006

(30) Foreign Application Priority Data

Nov. 10, 2004 (EP) .................................. 04292691

(51) Int. Cl.
*H04L 12/28* (2006.01)
*H04L 12/56* (2006.01)
(52) U.S. Cl. .................. 370/254; 370/392; 370/401
(58) Field of Classification Search .......... 370/252–255, 370/389, 390, 392, 400, 401, 477
See application file for complete search history.

(56) References Cited

U.S. PATENT DOCUMENTS

| | | | | |
|---|---|---|---|---|
| 6,229,806 B1 * | 5/2001 | Lockhart et al. | ............... | 370/389 |
| 6,914,887 B2 * | 7/2005 | Idsinga | ...................... | 370/255 |
| 7,107,342 B1 * | 9/2006 | Holur et al. | ................... | 709/225 |
| 7,133,922 B1 * | 11/2006 | She et al. | ...................... | 709/231 |
| 7,193,974 B2 * | 3/2007 | Eatough et al. | ............... | 370/254 |
| 2003/0026230 A1 * | 2/2003 | Ibanez et al. | .................. | 370/338 |
| 2005/0076145 A1 * | 4/2005 | Ben-Zvi et al. | ............... | 709/245 |

OTHER PUBLICATIONS

T. Narten et al, "RFC 2461—Neighbor Discovery for IP Version 6 (IPv6)" Request for Comments, Network Working Group, Internet Engineering Task Force—Internet Society, Dec. 1, 1998, pp. 1-93, XP015008245.
S. Thomson et al, "RFC 2462—IPv6 Stateless Address Autoconfiguration", Request for Comments, Network Working Group, Internet Engineering Task Force—Internet Society, Dec. 1, 1998, pp. 1-25, XP015008246.

* cited by examiner

*Primary Examiner* — Hong Cho
(74) *Attorney, Agent, or Firm* — Sughrue Mion, PLLC

(57) ABSTRACT

An access multiplexer system for performing stateless auto-configuration processes for use in networks comprising access multiplexers for receiving discovery messages from sources, which discovery messages comprise multicast destination addresses defining numbers of destinations. In order to increase the security of the networks, the system is provided with agents for replacing the original number of multicast destination addresses in the discovery messages with a further number destination addresses defining further destinations, wherein the further number of destinations is smaller than the original number of destinations. Discovery messages are defined in RFC 2461 and 2462 and comprise solicitation messages, with the sources comprising hosts and with the destinations comprising network-units, or comprise advertisement messages, with the sources comprising network-units and with the destinations comprising hosts.

11 Claims, 1 Drawing Sheet

ACCESS MULTIPLEXER SYSTEM FOR PERFORMING A STATELESS AUTO-CONFIGURATION PROCESS

BACKGROUND OF THE INVENTION

1. Field of the Invention

The invention relates to an access multiplexer system for performing a stateless auto-configuration process for use in a network and comprising an access multiplexer for receiving a discovery message from a source, which discovery message comprises a multicast destination address defining a number of destinations.

2. Description of the Related Art

A prior art access multiplexer system is of common general knowledge. A discovery message is for example defined in RFC 2461 and 2462 and is used for requesting or allocating Internet Protocol addresses. The discovery message originates from a source, such as a customer premises equipment or a node respectively, and is destined for a number of destinations, such as nodes or customer premises equipments respectively. This number of destinations is defined by a multicast destination address forming part of a header of the discovery message. The access multiplexer system for performing a stateless auto-configuration process forms part of a network. In this network (such as for example an Internet Protocol Version 6 network), states of sources and destinations are not kept, contrary to a network in which a stateful auto-configuration process is performed (such as for example an other Internet Protocol Version 6 network or an Internet Protocol Version 4 network). Owing to the fact that the states are not kept in this kind of network, each discovery message must be sent to a relatively large number of destinations.

The known access multiplexer system is disadvantageous, inter alia, owing to the fact that the stateless auto-configuration process is relatively insecure in a shared and/or non-trusted network. A source must send each discovery message to a relatively large number of destinations, with only one destination being interested in this discovery message but with all the other destinations also receiving this discovery message.

SUMMARY OF THE INVENTION

It is an object of the invention, inter alia, to provide an access multiplexer system for performing a stateless auto-configuration process which is relatively secure.

The access multiplexer system according to the invention is characterized in that the access multiplexer system further comprises an agent for replacing the multicast destination address in the discovery message by a further destination address defining a further number of destinations, which further number of destinations is smaller than the number of destinations.

By introducing the agent, the discovery message is no longer sent to the relatively large number of destinations (a relatively large group), but is sent to a relatively small number of destinations (a relatively small group being a sub-group of the relatively large group). As a result, the stateless auto-configuration process has become relatively secure. A further advantage is that less bandwidth is consumed.

An embodiment of the access multiplexer system according to the invention is characterized in that the access multiplexer system comprises detecting means for detecting at least a part of the discovery message and comprises replacing means for, in response to a detection, performing said replacing.

The detecting means form part of the access multiplexer or form part of the agent. The replacing means form part of the access multiplexer or form part of the agent.

An embodiment of the access multiplexer system according to the invention is characterized in that the discovery message comprises a solicitation message, with the source comprising a host and with the destinations comprising network-units.

The solicitation message is well defined in RFC 2461 and 2462 and originates from the host. This host for example comprises a customer premises equipment, such as a personal computer or a modem. The network-units for example comprise Internet Protocol EDGE nodes.

An embodiment of the access multiplexer system according to the invention is characterized in that the agent comprises interfacing means for contacting information means for authenticating and/or billing a host and for in response providing the agent with information defining the further number of destinations.

By contacting the information means, such as a network management which authenticates and bills hosts, the agent is provided with the further number of destinations. This further number of destinations for example comprises one destination in the form of one network-unit.

An embodiment of the access multiplexer system according to the invention is characterized in that the discovery message comprises an advertisement message, with the source comprising a network-unit and with the destinations comprising hosts.

The advertisement message is well defined in RFC 2461 and 2462 and originates from the network-unit in reply to the solicitation message. This network-units for example comprises an Internet Protocol EDGE unit. The hosts for example comprise customer premises equipments, such as personal computers or modems. An embodiment of the access multiplexer system according to the invention is characterized in that the agent comprises interfacing means for contacting information means for linking a network-unit to a host and for in response providing the agent with information defining the further number of destinations.

By contacting the information means, such as a network management which links a network-unit to one or more hosts, for example by checking which hosts have communicated with this network-unit before or by checking which hosts are subscribed to one or more services serviced by the network-unit, the agent is provided with the further number of destinations. This further number of destinations for example comprises a relatively small number of destinations in the form of a relatively small number of hosts such as a few hosts.

The invention also relates to an agent for use in an access multiplexer system for performing a stateless auto-configuration process in a network and comprising an access multiplexer for receiving a discovery message from a source, which discovery message comprises a multicast destination address defining a number of destinations, which agent according to the invention is characterized in that the agent is arranged to replace the multicast destination address in the discovery message by a further destination address defining a further number of destinations, which further number of destinations is smaller than the number of destinations.

The invention yet also relates to a network comprising an access multiplexer system for performing a stateless auto-configuration process and comprising an access multiplexer for receiving a discovery message from a source, which discovery message comprises a multicast destination address defining a number of destinations, which network according to the invention is characterized in that the network further comprises an agent for replacing the multicast destination address in the discovery message by a further destination address defining a further number of destinations, which further number of destinations is smaller than the number of destinations.

The invention further relates to a method for access multiplexing for performing a stateless auto-configuration process in a network and comprising a receiving step of receiving a discovery message from a source, which discovery message comprises a multicast destination address defining a number of destinations, which method according to the invention is characterized in that the method further comprises a replacing step of replacing the multicast destination address in the discovery message by a further destination address defining a further number of destinations, which further number of destinations is smaller than the number of destinations.

The invention yet further relates to a processor program product for access multiplexing for performing a stateless auto-configuration process in a network and comprising a receiving function of receiving a discovery message from a source, which discovery message comprises a multicast destination address defining a number of destinations, which processor program product according to the invention is characterized in that the processor program product further comprises a replacing function of replacing the multicast destination address in the discovery message by a further destination address defining a further number of destinations, which further number of destinations is smaller than the number of destinations.

Embodiments of the agent according to the invention and of the network according to the invention and of the method according to the invention and of the processor program product according to the invention correspond with the embodiments of the access multiplexer system according to the invention.

The invention is based upon an insight, inter alia, that, when a discovery message intended for only one destination is sent to many destinations, the security risk is increased, and is based upon a basic idea, inter alia, that an agent is to be used for limiting a number of destinations that receive the same discovery message.

The invention solves the problem, inter alia, to provide an access multiplexer system for performing a stateless auto-configuration process which is relatively secure, and is further advantageous, inter alia, in that that less bandwidth is consumed.

These and other aspects of the invention will be apparent from and elucidated with reference to the embodiments(s) described hereinafter.

DETAILED DESCRIPTION OF EXEMPLARY EMBODIMENTS OF THE PRESENT INVENTION

Figure 1:
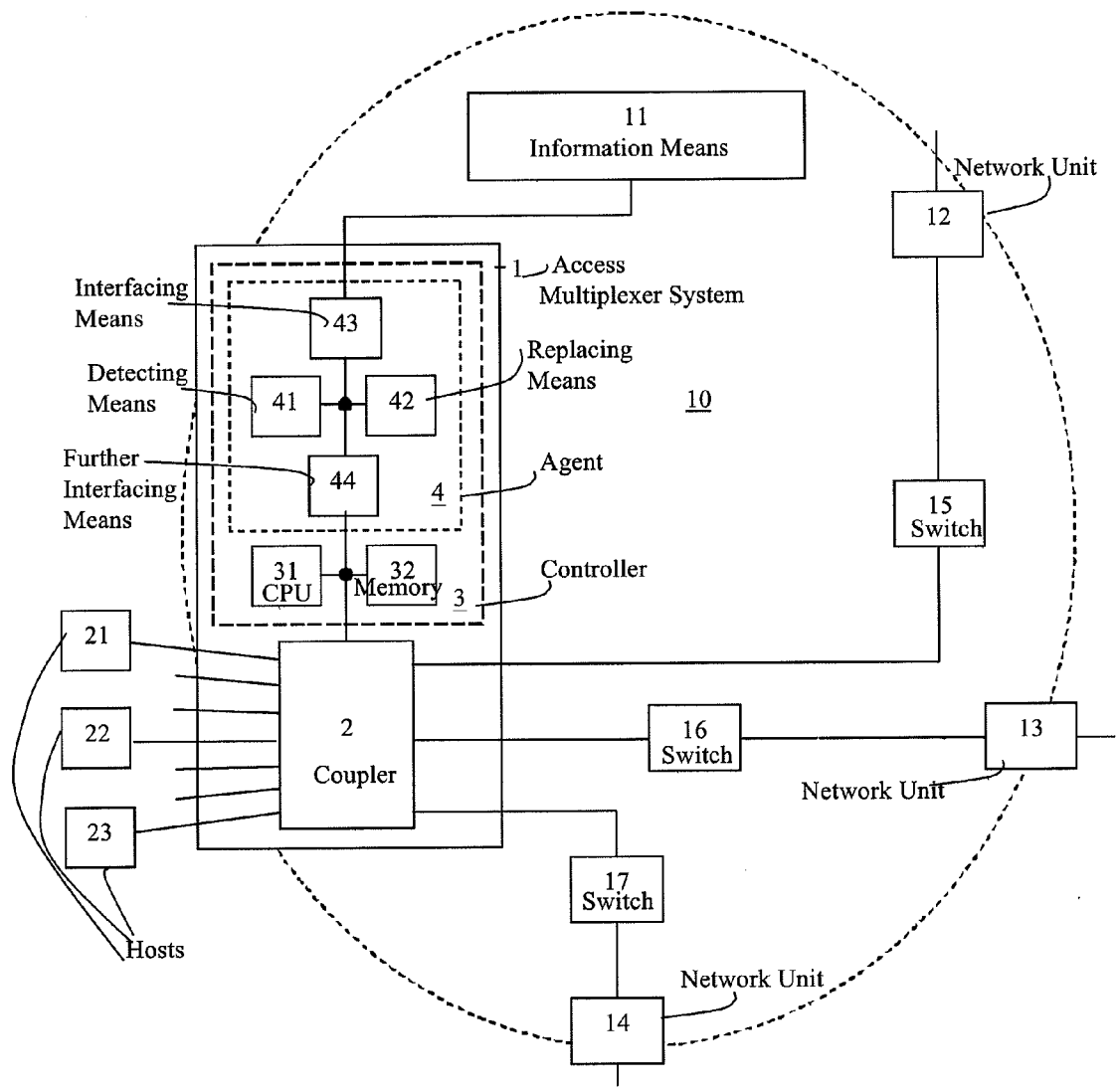
FIG. 1 shows diagrammatically a network according to the invention comprising an access multiplexer system according to the invention for performing a stateless auto-configuration process and an agent according to the invention.

The network 10 according to the invention shown in FIG. 1 such as for example an access network comprises an access multiplexer system 1 according to the invention for performing a stateless auto-configuration process. The access multiplexer system 1 comprises an access multiplexer 2,3 comprising a coupler 2 and a controller 3. The controller 3 comprises an agent 4 according to the invention. The controller 3 further comprises a processor 31 and a memory 32 coupled to a link between the coupler 2 and the agent 4. The agent comprises detecting means 41 and replacing means 42 and interfacing means 43 and further interfacing means 44. The further interfacing means 44 are coupled to the link and are further coupled via a bus to the other means 41-43. The interfacing means 43 are further coupled to information means 11.

The network 10 further comprises respective network-units 12-14 coupled via respective switches 15-17 to the coupler 2. The coupler 2 is further coupled to hosts 21-23. The network-units 12-14 for example comprise Internet Protocol EDGE nodes, the hosts for example comprise customer premises equipments, such as personal computers or modems, and the information means for example comprise a network management or a local database.

In a prior art situation, to get (a part of) an Internet Protocol address, a host 21 generates a solicitation message as defined in RFC 2461 and 2462 in a way common in the art. This solicitation message comprises a multicast destination address defining the hosts 22,23 and the network-units 12-14 in the network 10. In case of an other access multiplexer not shown being present in the same layer-2 segment, its hosts not shown will also be reached by this solicitation message. The access multiplexer system 1 detects this multicast destination address in a way common in the art, for example via a detector forming part of the processor 31, and in response copies the solicitation message and sends three solicitation messages to the network-units 12-14. For example owing to the fact that the host 21 prefers the network-unit 12 to serve this host 21 where both other network-units are not preferred to serve this host 21, only the network-unit 12 responds to the solicitation message by generating an advertisement message as defined in RFC 2461 and 2462 in a way common in the art. This advertisement message comprises a multicast destination address defining the hosts 21-23 (all hosts in the layer-2 segment) and is supplied via the switch 15 to the access multiplexer system 1. The access multiplexer system 1 detects this multicast address in a way common in the art, for example via a detector forming part of the processor 31, and in response copies the advertisement message and sends three advertisement messages to the hosts 21-23. Owing to the fact that only the host 21 is interested in this response to its solicitation message, only the host 21 reacts to the advertisement message in a way common in the art, both other hosts 22,23 do not react.

Owing to the fact that one original solicitation message is copied and then sent to the hosts 22,23 and to all network-units 12-14, and owing to the fact that one original advertisement message is copied and then sent to all hosts 21-23, in the prior art situation there is a large security risk. Each host can reach each network-unit and each other host including those which the host should not be able to reach. And each host of a group of hosts receives each advertisement message including those which are not destined for this host.

According to the invention, the security of the stateless auto-configuration process is increased by introducing the agent 4. The agent 4 comprises the detecting means 41 for detecting a solicitation message originating from for example the host 21 by for example detecting a solicitation code in this message. The agent 4 further comprises the replacing means 42 for, in response to a detected solicitation message, replacing the multicast destination address in this solicitation message by a further destination address defining the network-unit 12. Thereto, the agent 4 contacts the information means 11 via the interfacing means 43. These information means 11 authenticate and bill the hosts 21-23 and provide the agent 4 with the further destination address defining the network-unit 12. This is possible because the information means 11 for example either have knowledge or can estimate which network-unit 12 (or limited group of network-units 12,13) is to be reached by this host 21 (for example by checking which hosts have communicated with this network-unit before or by checking which hosts are subscribed to one or more services serviced by the network-unit). As a result, the solicitation message is no longer multicasted to all network-units 12-14, but is only sent to the network-unit 12 (or the limited group of network-units 12,13).

The network-unit 12 reacts by supplying an advertisement message via the switch 15 to the access multiplexer system 1. The agent comprises the detecting means 41 for detecting the advertisement message originating from the network-unit 12 by for example detecting an advertisement code in this message. The agent 4 further comprises the replacing means 42 for, in response to a detected advertisement message, replacing the multicast destination address in this advertisement message by a further destination address (a unicast destination address) defining the host 21. Thereto, the agent 4 contacts the information means 11 via the interfacing means 43. These information means 11 can link a network-unit to a host and provide the agent 4 with the further destination address defining the host 21. This is possible because the information means 11 for example either have knowledge or can estimate which host 21 (or limited group of hosts 21,22) is to be reached by this network-unit 12 (for example by checking which hosts have communicated with this network-unit before or by checking which hosts are subscribed to one or more services serviced by the network-unit). As a result, the advertisement message is no longer multicasted to all hosts 21-23, but is only sent to the host 21 (or the limited group of hosts 21,22).

So, generally, the access multiplexer system 1 for performing a stateless auto-configuration process for use in a network 10 comprises an access multiplexer 2,3 for receiving a discovery message from a source, which discovery message comprises a multicast destination address defining a number of destinations, and further comprises an agent 4 for replacing the multicast destination address in the discovery message by a further destination address defining a further number of destinations, which further number of destinations is smaller than the number of destinations.

The discovery messages are firstly used for requesting (soliciting) an Internet Protocol version 6 address comprising 128 bytes. Of these 128 bytes, the first 64 bytes also known as prefix are supplied by the network 10 (more precisely: by the network-units 12-14) and the last 64 bytes for example correspond with the MAC address (Medium Access Control) of the host 21-23. Before this MAC address may be used, the network 10 will check its uniqueness by checking all the hosts 21-23 coupled to this network 10. The discovery messages are secondly used for allocating (advertising) the prefix, by supplying this prefix from the network-units 12-14 to the hosts 21-23 in response to the request (solicitation).

The agent 4 shown in FIG. 1 is just an embodiment, many alternatives are possible without departing from the scope of this invention. For example, one or more parts (41-44) of the agent 4 may be shifted into the access multiplexer 2,3. The detecting and replacing means 41,42 may be shifted and/or integrated into the processor 31. The information means 11 or a part of the information means may be shifted and/or integrated into the memory 32. The further interfacing means 44 form an interface between the link and the bus and can be avoided in case the link and the bus are combined and/or integrated. Alternatively, in that case the link and the bus represent the further interfacing means 44. The interfacing means 43 form an interface between the bus and the information means 11 and can be avoided in case the information means 11 are (partly) shifted and/or integrated into the memory 32 or in case the information means 11 are to be reached via the coupler 2. Alternatively, in that case the link and the bus or the coupler 2 represent the interfacing means 43. The agent 4 may further be located outside the access multiplexer system 1 etc. The advertisement messages may be sent in response to a reception of a solicitation message and may alternatively be sent regularly for information purposes and without being a response to a solicitation message. The information means 11 may be coupled directly to the network-units 12-14 and/or to the switches 15-17, and further network-units, further switches and further access multiplexer systems may be present, and further couplings and links may be present.

The expression "for" in for example "for receiving" and "for replacing" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well. The terms "a" and "an" do not exclude the possible presence of one or more pluralities.

The steps/functions of receiving and replacing do not exclude further steps/functions, like for example, inter alia, the steps/functions as described for the Fig.

The invention claimed is:

1. An access multiplexer system for performing a stateless auto-configuration process for use in a network, said system comprising:
   an access multiplexer which receives a discovery message from a source, said discovery message comprising a first multicast destination address defining a first number of destinations; and
   an agent which replaces the first multicast destination address in the discovery message with a second destination address defining a second number of destinations, said second number of destinations being smaller than the first number of destinations.

2. The access multiplexer system as defined in claim 1, wherein the access multiplexer system further comprises:
   a detecting means for detecting at least a part of the discovery message; and
   a replacing means for, in response to said detecting means detecting at least a part of the discovery message, replacing said first multicast destination address in the discovery message with the second destination address.

3. The access multiplexer system as defined in claim 2, wherein the discovery message comprises a solicitation message, having the source comprising a host, and having the destinations comprising network-units.

4. The access multiplexer system as defined in claim 3, wherein the agent comprises interfacing means for contacting an information means to authenticate or bill a host and for providing the agent with information defining the second number of destinations from the information means.

5. The access multiplexer system as defined in claim 2, wherein the discovery message comprises an advertisement message having the source comprising a network-unit and having the destinations comprising hosts.

6. The access multiplexer system as defined in claim 5, wherein the agent comprises interfacing means for contacting an information means for linking a network-unit to a host and for providing the agent with information defining the second number of destinations from the information means.

7. The access multiplexer system as defined in claim 1, wherein the second destination address comprises a unicast address defining a single destination.

8. The access multiplexer system as defined in claim 1, wherein the agent sends the discovery message to the destinations defined by the second destination address.

9. An agent for use in an access multiplexer system which performs a stateless auto-configuration process in a network, the agent comprising:
   a detecting means which detects a discovery message from a source, said discovery message comprising a first multicast destination address defining a first number of destinations; and
   a replacing means which replaces the first multicast destination address in the discovery message with a second destination address defining a second number of destinations, said second number of destinations being smaller than the first number of destinations.

10. A network comprising:
   an access multiplexer system which performs a stateless auto-configuration process, said access multiplexer system comprising:
      an access multiplexer which receives a discovery message from a source, said discovery message comprising a first multicast destination address defining a first number of destinations; and
      an agent which replaces the first multicast destination address in the discovery message with a second destination address defining a second number of destinations, said second number of destinations being smaller than the first number of destinations.

11. A method for access multiplexing to perform a stateless auto-configuration process in a network, the method comprising:
   receiving a discovery message from a source, said discovery message comprising a first multicast destination address defining a first number of destinations; and
   replacing the first multicast destination address in the discovery message with a second destination address defining a second number of destinations, said second number of destinations being smaller than the first number of destinations.

* * * * *